(12) United States Patent  
Liao

(10) Patent No.: US 7,397,045 B2  
(45) Date of Patent: Jul. 8, 2008

(54) EXPOSURE APPARATUS AND METHOD THEREOF

(75) Inventor: Ying-Jyh Liao, Sanchong (TW)

(73) Assignee: AU Optronics Corp., Hsinchu (TW)

( * ) Notice: Subject to any disclaimer, the term of this patent is extended or adjusted under 35 U.S.C. 154(b) by 244 days.

(21) Appl. No.: 11/342,977

(22) Filed: Jan. 30, 2006

(65) Prior Publication Data

US 2006/0158637 A1    Jul. 20, 2006

(30) Foreign Application Priority Data

Feb. 21, 2005   (TW) .............................. 94105044 A

(51) Int. Cl.
 *G21G 1/12*   (2006.01)
(52) U.S. Cl. .............. 250/492.1; 250/492.2; 250/494.1; 250/504 R; 156/306.9; 156/331.1; 204/478
(58) Field of Classification Search .............. 250/492.1, 250/492.2, 494.1, 504 R; 156/306.9, 331.1; 204/478
See application file for complete search history.

(56) References Cited

U.S. PATENT DOCUMENTS 4,254,325 A  *  3/1981  Snyder ........................ 219/413  
5,263,888 A  * 11/1993  Ishihara et al. ................ 445/25

FOREIGN PATENT DOCUMENTS

CN        1570736          1/2005  
CN        1570736 A  *    1/2005

* cited by examiner

*Primary Examiner*—Jack I. Berman  
*Assistant Examiner*—Michael Maskell  
(74) *Attorney, Agent, or Firm*—Thomas, Kayden, Horstemeyer & Risley

(57) ABSTRACT

An exposure apparatus includes a loading device, a first energy-producing device, and a second energy-producing device. The loading device comprises a plurality of supporting elements, supporting a panel. The first and second energy producing devices are disposed above and below the loading device, respectively.

18 Claims, 4 Drawing Sheets

EXPOSURE APPARATUS AND METHOD THEREOF

BACKGROUND

The invention relates to an exposure apparatus, and in particular to an exposure apparatus and method thereof utilized in manufacture of a liquid crystal display.

As shown in FIG. 1, during manufacture of a liquid crystal panel, a panel 10' is disposed on a conventional loading mechanism 20'. The conventional loading mechanism 20' is made of non-transparent material such as aluminum. The panel 10' comprises two substrates 11' and 12', and a sealant 13'. The substrate 11' comprises color filter (CF), and the substrate 12' comprises thin film transistor (TFT). There are two panel manufacturing methods. In one method, the substrates 11' and 12' are connected by the sealant 13'. Then, the sealant 13' must be chemically reacted to solidify. For example, UV light of certain wavelength produced by a light source 15' can solidify the photosensitive sealant 13'. Heating can also be used to solidify the sealant 13'. In this method, after the sealant 13' is solidified, an empty cell is formed, and liquid crystal 16' is filled therein. In another method, the sealant 13' is applied to the edge of the lower substrate 12', and liquid crystal 16' is dropped by a one-drop-fill (ODF) method. After ODF, the upper substrate 11' is covered thereon. UV light solidifies the sealant 13' to form a liquid crystal panel.

In a computer integrated manufacturing (CIM) system, due to limitation of related devices, in said both manufacturing methods, each production line can only provide single-side exposure, that is, UV light can only illuminate one of the CF or TFT substrate. Complete solidification requires the substrate 11' side to be exposed to the UV light to partially solidify the sealant 13', and then rotate 180° to illuminate the opposing substrate 12'. The process is complicated, increasing loads on the CIM system and high manufacturing costs. The manufacturing time is also longer such that the production line cannot be efficiently utilized, thereby limiting product design.

SUMMARY

It is therefore an object of the present invention to provide an exposure apparatus and method thereof to eliminate the shortcomings described, such that both CF and TFT substrates can be exposed at the same time, reducing costs, increasing available space in processing, and simplifying process.

Since the exposure apparatus is simple and eliminates most portions that block UV light, the sealant is solidified rapidly, reducing system burden, and increasing operating availability, utilization rate, and work ratio. Production rate is increased accordingly.

The invention achieves the above-identified object by providing an exposure apparatus, comprising a loading device, a first energy-producing device, and a second energy-producing device. The loading device comprises a plurality of supporting elements and is for supporting a panel. The first and second energy producing devices are disposed above and below the loading device, respectively. A predetermined gap is formed between the supporting elements.

The supporting elements comprise light-permeable material.

In an embodiment, when the supporting elements are bar-shaped, the supporting elements comprise quartz, compound quartz, glass, or combinations thereof.

In another embodiment, the supporting elements are line-shaped. The supporting elements comprise cables, ropes, wires, or combinations thereof.

At least one of the first energy-producing device and the second energy-producing device produces UV light energy.

The exposure apparatus further comprises a frame, connecting the loading device, the first energy-producing device, and the second energy-producing device. The frame comprises an upper layer, a hollow middle layer, and a lower layer. The hollow middle layer is disposed between the upper layer and the lower layer.

The loading device, the first energy-producing device, and the second energy-producing device are disposed on the hollow middle layer, the upper layer, and the lower layer, respectively.

Further provided is a method for exposing a panel, comprising applying a sealant around at least part of the panel, and exposing the panel by an exposure apparatus from top and bottom directions at the same time to solidify the sealant.

BRIEF DESCRIPTION OF THE DRAWINGS

The invention can be more fully understood by reading the subsequent detailed description in conjunction with the examples and references made to the accompanying drawings, wherein.

DETAILED DESCRIPTION

Figure 1:
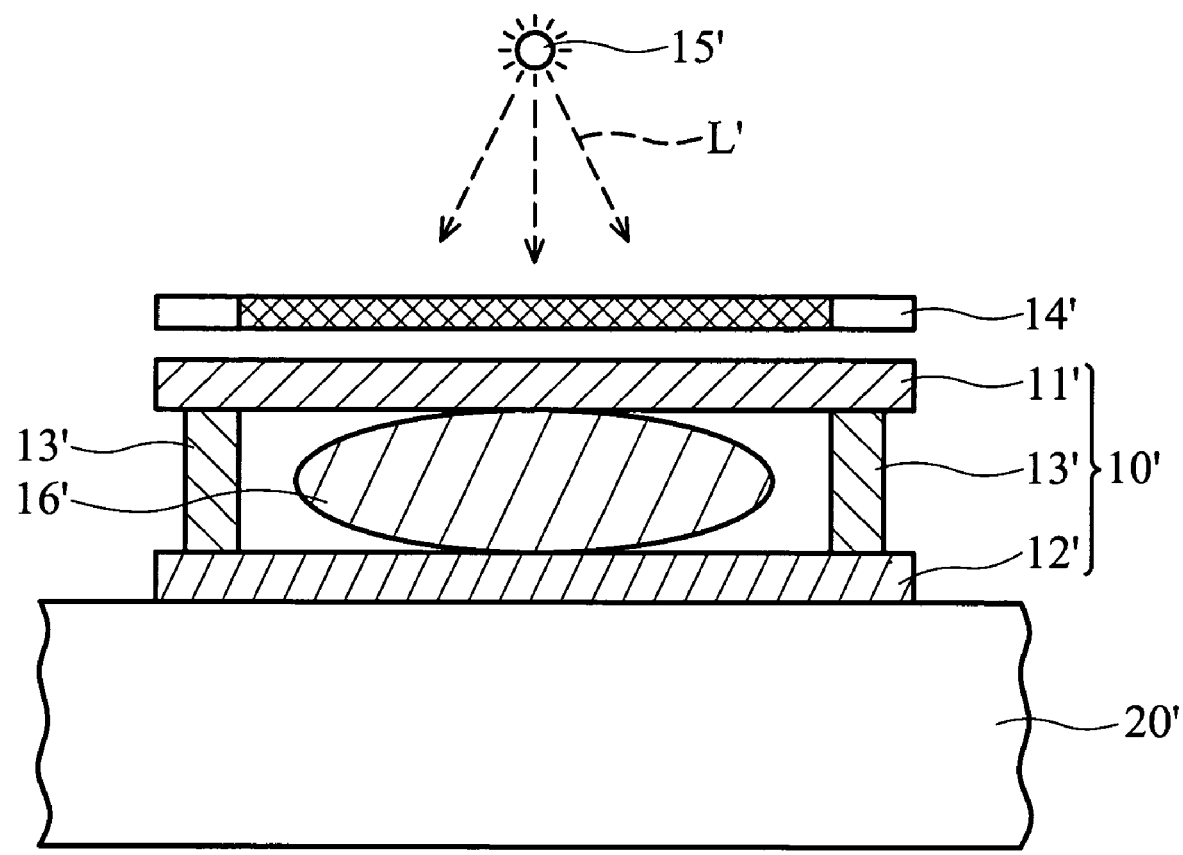
FIG. 1 is a schematic side view of a conventional loading mechanism and substrates.
Figure 2:
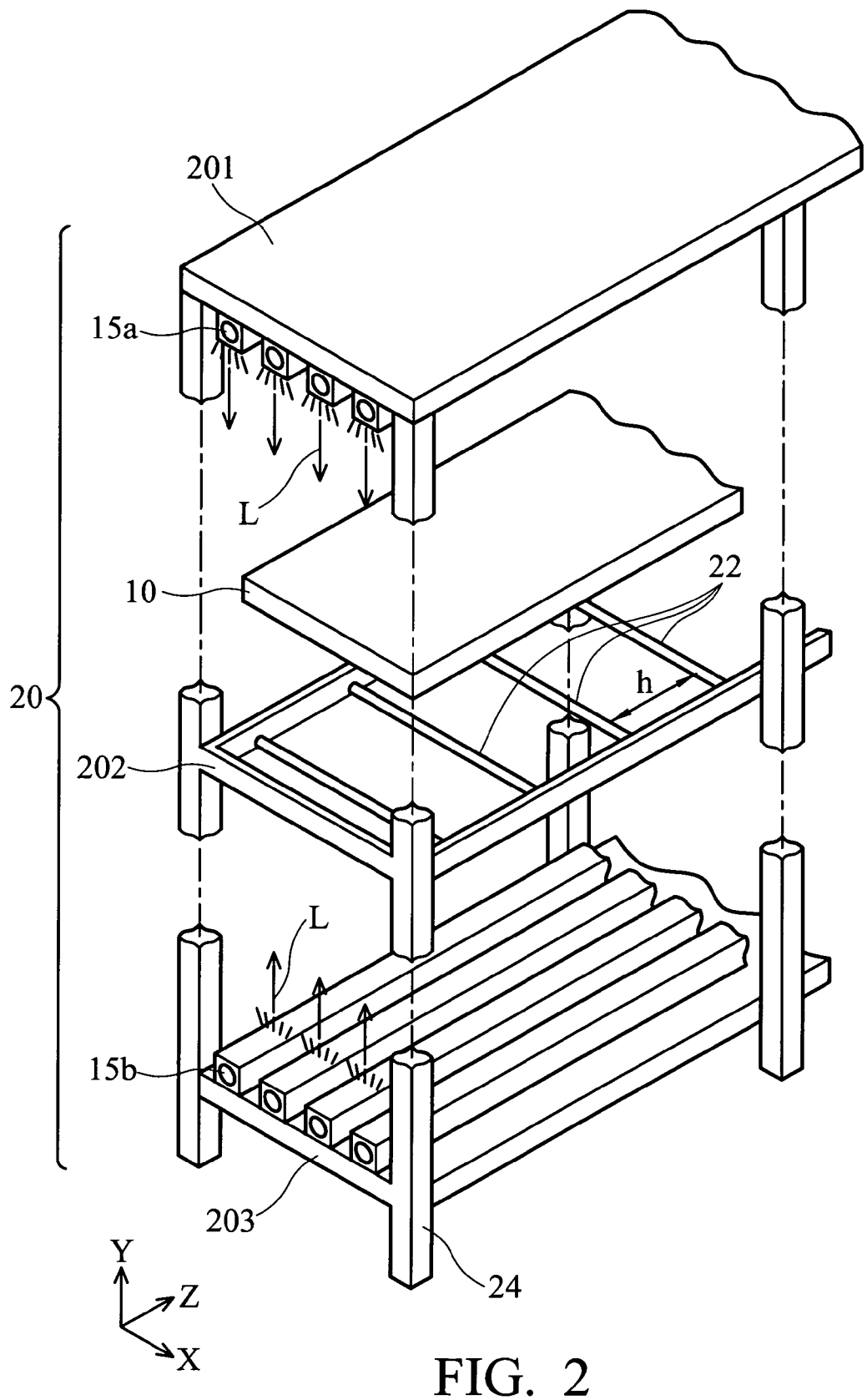
FIG. 2 is an exploded view of an embodiment of an exposure apparatus of the invention.
Figure 3A:
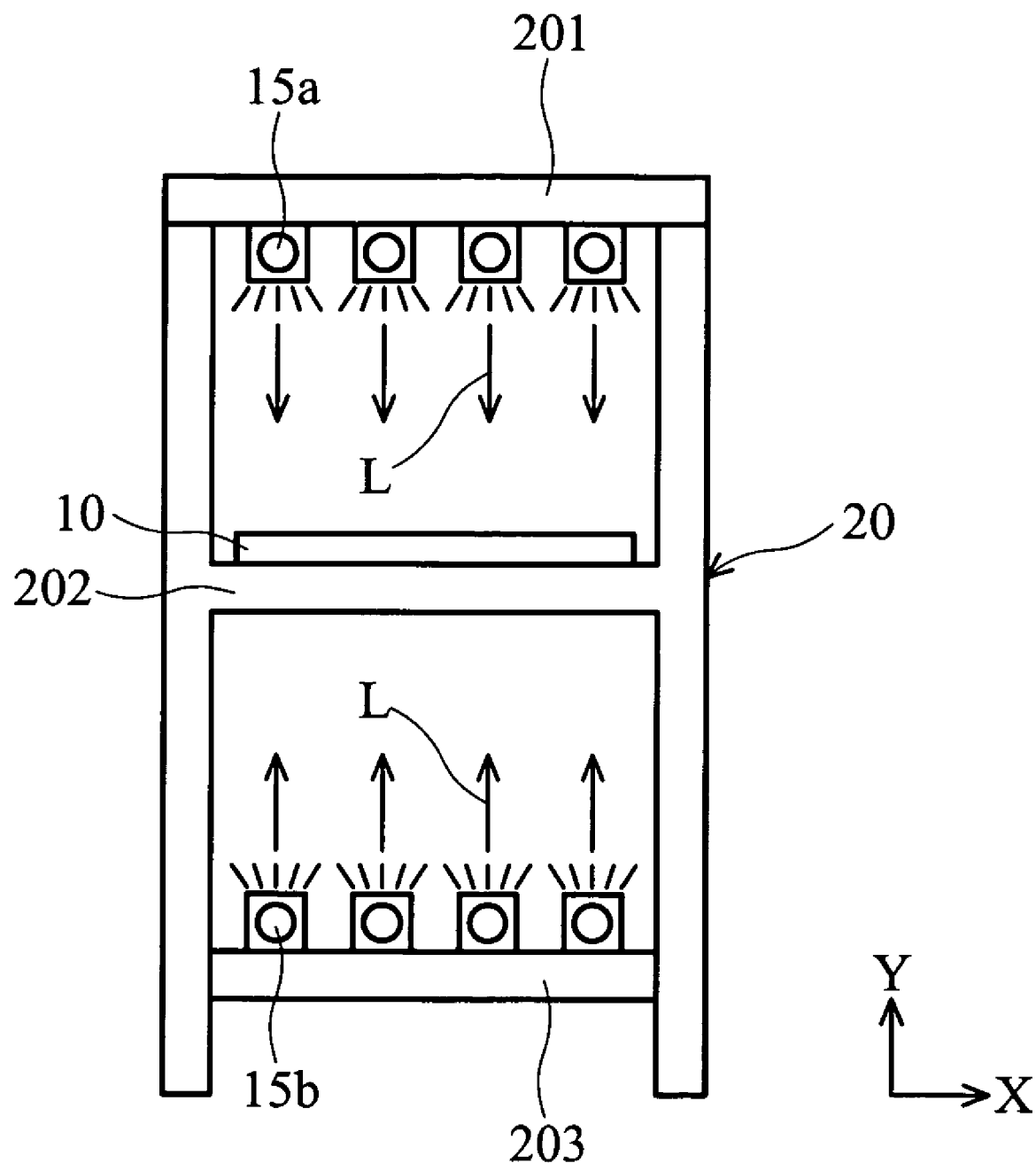
FIG. 3A is a front view of an exposure apparatus after assembly.
Figure 3B:
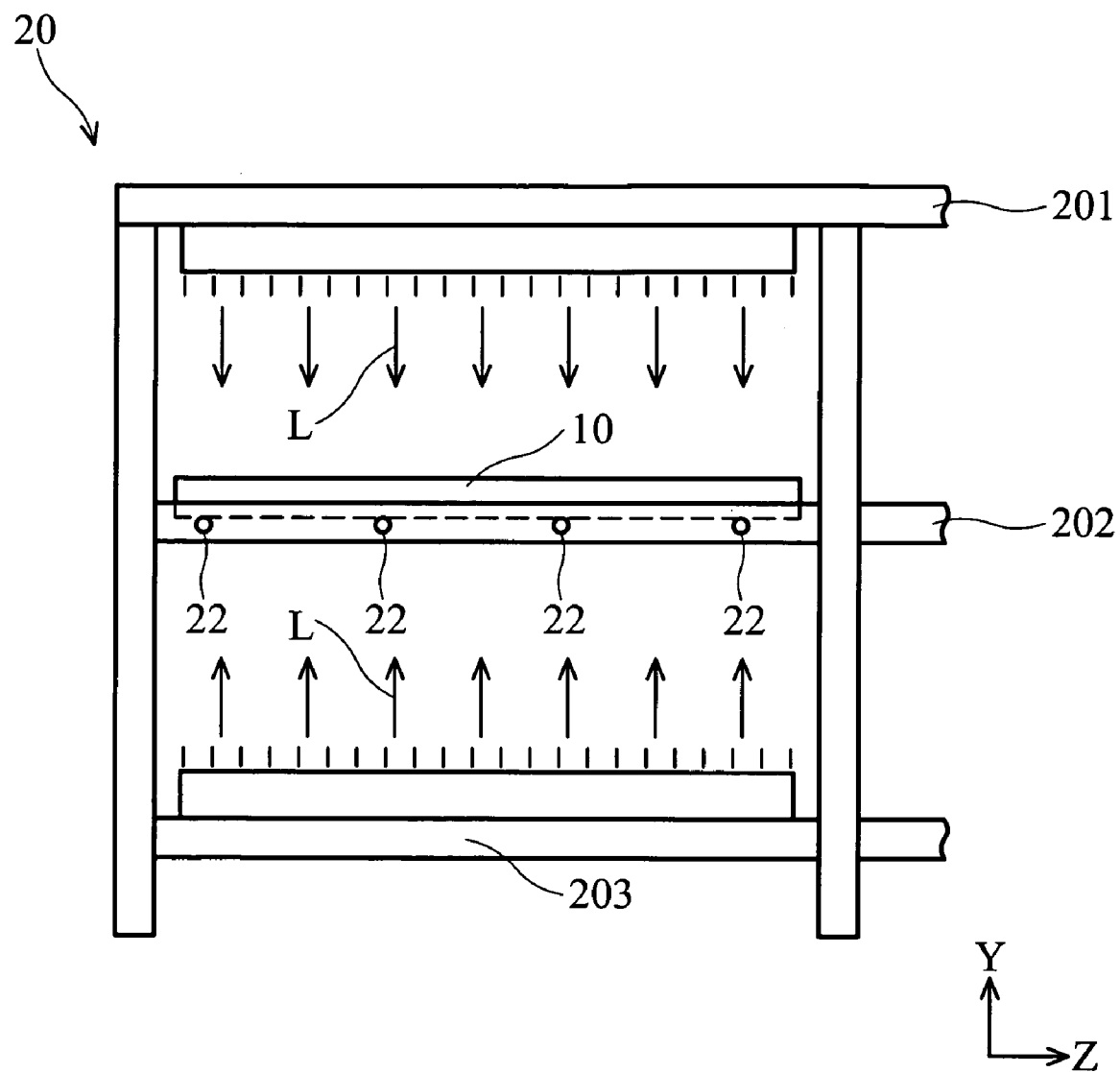
FIG. 3B is side view of an exposure apparatus after assembly.

FIG. 2 is an exploded view of an embodiment of an exposure apparatus 200 of the invention. FIG. 3A is a front view of an exposure apparatus 200 after assembly. FIG. 3B is side view of an exposure apparatus 200 after assembly.

The exposure apparatus 200 comprises a loading device having a plurality of supporting elements 22, a first energy-producing device 15a, a second energy-producing device 15b, and a frame 20. The first energy-producing device 15a and the second energy-producing device 15b produce UV light energy. The frame 20, connecting the supporting elements 22, the first energy-producing device 15a, and the second energy-producing device 15b, comprises an upper layer 201, a hollow middle layer 202, a lower layer 203, and a plurality of poles 24. The hollow middle layer 202 is disposed between the upper layer 201 and the lower layer 203.

FIG. 2 is an exploded view of the frame 20, separated into upper layer 201, hollow middle layer 202, and lower layer 203 for clear explanation. The frame 20 can be integrally formed in a hollow frame. In this embodiment, the first energy-producing device 15a is disposed on the upper layer 201. The second energy-producing device 15b is disposed on the lower layer 203, opposing the first energy-producing device 15a.

As shown in FIG. 2, the supporting elements 22 are disposed on the hollow middle layer 202, between the first energy-producing device 15a and the second energy-producing device 15b. The supporting elements 22 are substantially parallel. The supporting elements 22 support the panel 10 simultaneously. Note that the structure of the panel 10 is the same as the conventional panel, and thus, no further explanation is provided. In the embodiment, when the panel 10 is disposed on the loading device 20, the upper side or the lower side of the panel 10 is not limited to the CF or TFT substrate. That is, by utilizing the exposure apparatus 200 of the invention, during manufacture, the invention does not restrict the exposing side of the panel 10.

A predetermined gap h is formed between the supporting elements 22. The gap h varies with the size of the moving arm transferring substrates. The gap is about 200 mm such that the moving arm or robot can smoothly enter the loading device 20 to place the substrate thereon without any interference. The energy L produced by the second energy-producing device 15b transmits upwardly through the gap h to the panel 10. Additionally, the first energy-producing device 15a illuminates from the top. Thus, energy is simultaneously transmitted to both sides of the panel 10.

In one embodiment, the supporting elements 22 are bar-shaped, and comprise light-permeable material such as quartz bars, compound quartz bars, glass bars, or combinations thereof. Thus, energy can penetrate the supporting elements 22.

In another embodiment, the supporting elements 22 are line-shaped. The supporting elements 22 comprise cables, ropes, wires, or combinations thereof.

In conclusion, the exposure apparatus of the invention exposes both sides of a panel at the same time. An exposure method comprises the following steps. First, a panel 10 or substrate is provided. A sealant is partially or fully arranged around the panel. The panel is then exposed to light energy by the exposure apparatus described from top and bottom directions at the same time to solidify the sealant. The process is simplified, and the exposing time can be shortened.

Hence, the CF and TFT sides of the panel 10 can be simultaneously exposed to UV light via the exposure apparatus and method thereof. The investment cost in the CIM system can be reduced. The burden to the system can be simplified while providing more available space in the processing room such as a clean room since the production line can be shortened. The complexity of the ODF process can also be simplified. Since the exposure device is simple and eliminates most portions that block UV light, the sealant can be rapidly solidified, reducing system burden, and increasing operating availability, utilization rate, and work ratio. Thus, production rate is increased accordingly.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An exposure apparatus, comprising:
   a loading device, having a hollow middle layer and a plurality of supporting elements disposed on the hollow middle layer, for supporting a panel;
   a first energy-producing device; and
   a second energy-producing device;
   wherein the first and second energy-producing devices are disposed above and below the loading device, respectively, and the hollow middle layer is thicker than each of the supporting elements to form a height difference.

2. The exposure apparatus as claimed in claim 1, wherein the supporting elements are arranged with a predetermined gap therebetween.

3. The exposure apparatus as claimed in claim 1, wherein the supporting elements are made of light-permeable material.

4. The exposure apparatus as claimed in claim 1, wherein the supporting elements comprise quartz, compound quartz, glass, or combinations thereof.

5. The exposure apparatus as claimed in claim 1, wherein the supporting elements are line-shaped.

6. The exposure apparatus as claimed in claim 1, wherein the supporting elements comprise cables, ropes, wires, or combinations thereof.

7. The exposure apparatus as claimed in claim 1, wherein at least one of the first energy-producing device and the second energy-producing device produces UV light energy.

8. The exposure apparatus as claimed in claim 1, further comprising a frame configured to connect the loading device, the first energy-producing device, and the second energy-producing device.

9. The exposure apparatus as claimed in claim 8, wherein the frame comprises an upper layer, a hollow middle layer, and a lower layer, and the hollow middle layer is disposed between the upper layer and the lower layer.

10. The exposure apparatus as claimed in claim 9, wherein the supporting elements, the first energy-producing device, and the second energy-producing device are disposed on the hollow middle layer, the upper layer, and the lower layer, respectively.

11. A method for exposing a panel, comprising:
    holding the panel via a moving arm;
    providing a loading device having a plurality of supporting elements arranged with a predetermined gap therebetween;
    entering the moving arm through the predetermined gap to the loading device;
    placing the panel on the supporting elements without any interference; and applying a sealant around at least part of the panel.

12. The method for exposing the panel as claimed in claim 11, further comprising:
    producing an UV light energy downwardly to the panel; and
    solidifying the sealant via the UV light energy.

13. The method for exposing the panel as claimed in claim 11, further comprising:
    producing an UV light energy upwardly through the gap to the panel; and
    solidifying the sealant via the UV light energy.

14. The method for exposing the panel as claimed in claim 11, further comprising:
    producing an UV light energy penetrating through the supporting elements; and
    solidifying the sealant via the UV light energy.

15. The exposure apparatus as claimed in claim 1, wherein the supporting elements are bar-shaped.

16. The exposure apparatus as claimed in claim 1, wherein at least one of at least one of the first energy-producing device and the second energy-producing device substantially perpendicular to the supporting elements.

17. The exposure apparatus as claimed in claim 1, wherein the first energy-producing device and the second energy-producing device substantially parallel to each other.

18. The exposure apparatus as claimed in claim 2, wherein the predetermined gap is about 200 mm.

* * * * *